July 14, 1970  R. T. AHRENS ET AL  3,520,438
BREAD SET
Filed June 25, 1968
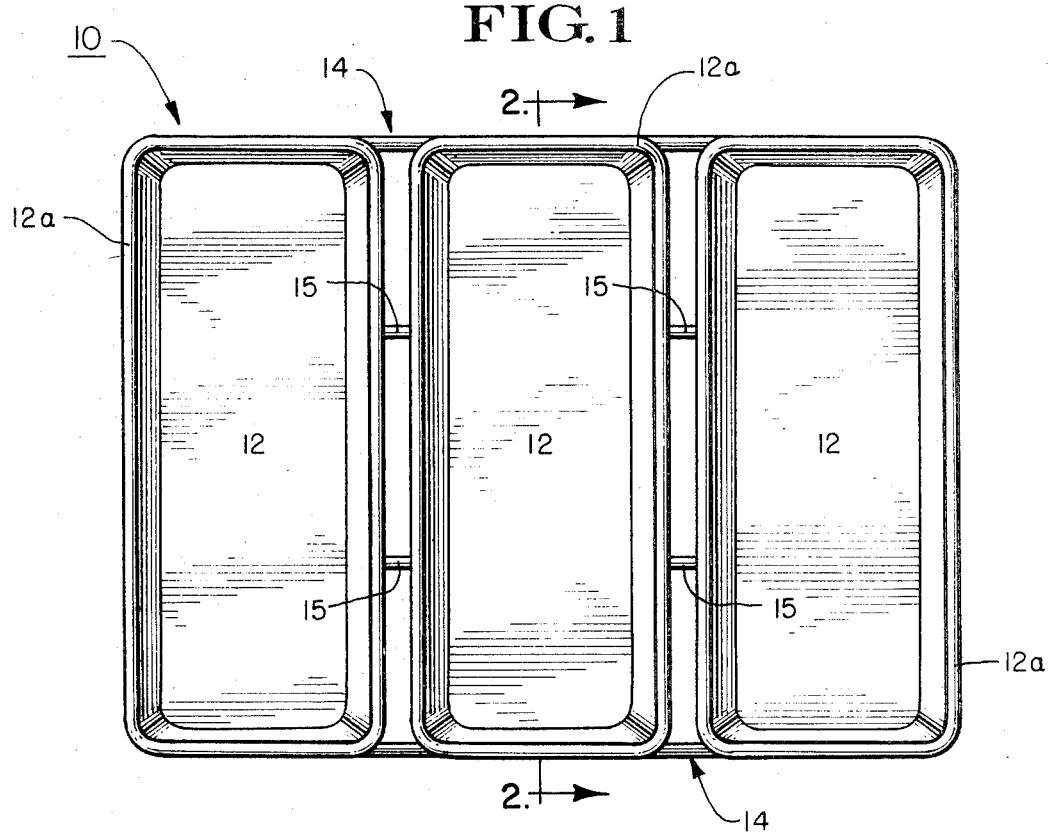
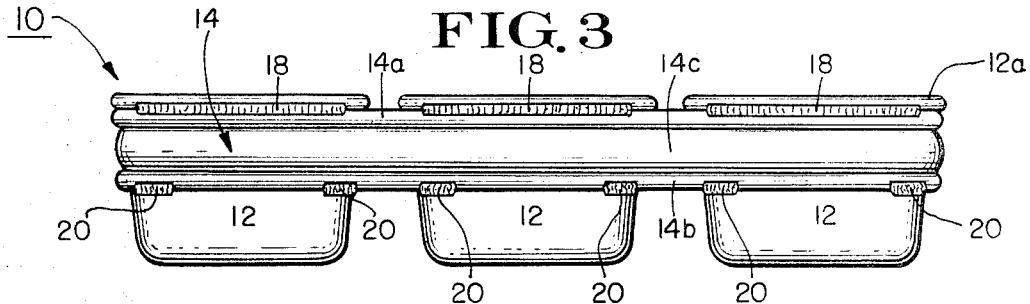
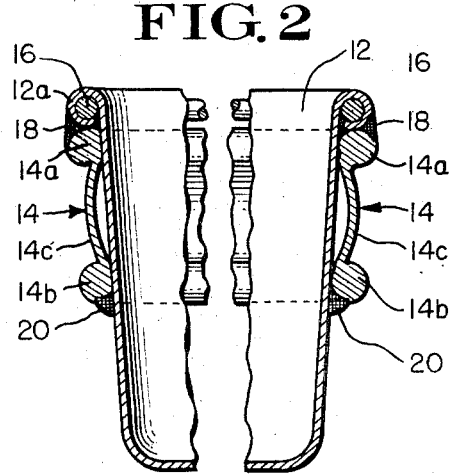
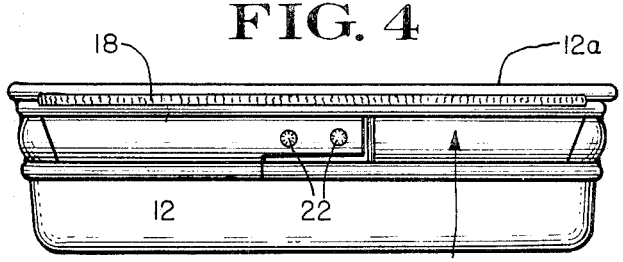
Inventors
Richard T. Ahrens
Eric S. Apelgren
By *Hume, Clement, Hume & Lee*
Attorneys 3,520,438
BREAD SET
Richard T. Ahrens, Cary, and Eric S. Apelgren, Barrington, Ill., assignors to Chicago Metallic Manufacturing Company, Lake Zurich, Ill., a corporation of Delaware
Filed June 25, 1968, Ser. No. 739,743
Int. Cl. B65d 21/02
U.S. Cl. 220—23.2                                4 Claims

ABSTRACT OF THE DISCLOSURE

A bread set or the like and its method of manufacture are disclosed. The bread set includes a plurality of bread baking pans held in a spaced array by an elongated strap or band that peripherally encloses the array and is individully welded to each pan. Specifically, the upper edge portion of each pan sidewall is rolled outwardly to form a conventional rolled bead protective rim for the pan and the enclosing band is positioned at the underside of the rolled bead on those pan sidewalls defining the outer periphery of the pan array; a substantially continuous weld is made between the underside of the rolled bead of each of these pan sidewalls and the upper surface of the adjacent band to securely retain the pans in the fixed array and concurrently prevent an unrolling, etc. of the rolled bead as may otherwise occur with heavy use. Other features are disclosed.

---

The present invention relates generally to baking or cooking utensils and, more particularly, is directed to a new and improved bread set or the like and to its method of manufacture.

SUMMARY OF THE INVENTION

It is a primary object of the present invention to provide a new and improved bread set or the like of a superior structural integrity than comparable prior art constructions.

It is another object of the invention to provide a structure of the above type that is neat and clean in appearance and is substantially devoid of crevices, etc. that may collect grease, etc.

It is a more specific object of the invention to provide a bread set in which the rolled bead rim portions of those pan sidewalls that define the outer periphery of the array are attached to an encompassing band by a continuous weld between the lower edge of the rolled bead and the upper edge of the band of each of the "outer" pan sidewalls thereby locking the pan rims and the encompassing strap into an integral unit to securely retain the pans in the assembled array and to preclude uncurling of the rolled pan bead or rim despite the hard use typically encountered in commercial bakeries.

Accordingly, the invention is directed to a bread set or the like comprising a plurality of metal pans each including a bottom portion and a plurality of upwardly extending sidewalls having a rolled bead upper edge portion or rim, the pans being arranged in a predetermined spaced array. An upper edge portion of an elongated strap means is positioned adjacent the underside of the rolled bead rim portion of predetermined ones of the sidewalls of the several pans to peripherally enclose the array of pans. Connecting means, defining a substantially continuous attachment between the upper edge portion of the strap means and the underside of the rolled bead edge portions of the predetermined pan sidewalls are provided for maintaining the pans in the predetermined spaced array and for securely fixing the rolled bead edge portions in position.

In accordance with a method of the invention, the aforesaid continuous attachment is made by effecting a substantially continuous weld, preferably by an inert-gas metal-arc welding technique, between the lower edge of the rolled bead and the upper edge portion of the strap means.

BRIEF DESCRIPTION OF THE DRAWINGS

The novel features of the present invention are set forth with particularity in the appended claims. The invention together with further objects and advantages thereof may best be understood, however, by reference to the folowing description taken in conjunction with the accompanying drawings in the several figures of which like reference numerals identify like elements and in which:

FIG. 1 is a plan view of a bread set constructed in accordance with the teachings of the present invention;

FIG. 2 is a cross-sectional view taken along lines 2—2 of FIG. 1;

FIG. 3 is a side elevation of the bread set of FIG. 1; and

FIG. 4 is an end elevation of the bread set of FIG. 1.

DESCRIPTION OF THE PREFERRED EMBODIMENTS

Referring now to FIG. 1, there is illustrated a bread set generally designated by the reference numeral 10 which comprises a plurality of individual bread baking pans 12 or the like that are maintained in a predetermined spaced array by means of an encompassing band or strap means 14 that is individually affixed to each of the pans. In the present embodiment, the array is composed of three pans of rectangular configuration although it is understood that the bread set may include a larger number of pans and that the pans may be of other shapes. A pair of stainless steel spacers 15 are interposed between each adjacent pair of pans to maintain a selected spacing between the pans and to permit circulation of heated air currents between the pans when in service. The two spacers 15 are located approximately one-third of the way from the ends of the respective pairs of adjacent pans and are thereat welded to the pans.

The pans 12 are of a generally conventional construction and preferably are drawn from a single piece of metal, such as aluminum, and are free from laps, folds, joints, seams, etc. All of the sidewalls of each pan are inclined outwardly to a modest degree to permit easy removal of the baked products from them. The upper edge portions of the sidewalls of the pans 12 are contoured to provide a smooth, protective rim portion 12a about the entire periphery of the pan. As best shown in FIG. 2, the rim 12a is defined by rolling the upper edge portion of each pan sidewall outwardly about a reinforcing wire 16 which, in addition to functioning as a form of the rolled edge portion of the pan, also serves to strengthen the pan 12. To the extent thus described, the bread set 10 is conventional.

The bread set 10 is useful, for example, in commercial bakeries where large quantities of baked products are concurrently baked in a series or group of such bread sets. In such environments, the bread sets incur a heavy and repeated use and with certain prior art structures it has been found that rolled bead rim portion of the pans tends to lift or uncurl and that the encompassing strap which is usually spot welded to the pan may actually break away from the pan and thus require repair or discarding of the bread set. It has also been found that these prior art constructions do not maintain a neat and clean appearance with repeated use and tend to collect grease, etc.

The bread set 10 of the present invention obviates the foregoing problems. Specifically, the elongated strap means 14 is adapted to peripherally enclose the pans of the bread set and is so located that its upper edge portion is immediately adjacent the underside of the rolled beads on the "outer" sidewalls of the pans 12 of the array. A substantially continuous attachment is made between the upper edge portion of the strap 14 and the underside of the rolled bead or rim 12a of predetermined sidewalls of the pan 12 by a connecting means 18, as is clearly seen in FIGS. 3 and 4. Preferably, the connecting means 18 is a metal of like type to that of the pans 12 and the band or strap 14. The metal 18 is deposited by welding so as to form a continuous integral connection between each rim and the upper edge portion of each strap means over substantially the full length of each of the pan sidewalls that are contiguous the strap 14. It is presently preferred that the pans 12, the strap 14 and the metal 18 all be of aluminum and that the metal 18 be deposited by an inert-gas metal-arc welding process known to the art wherein the inert-gas utilized is argon.

Although the lower edge of the strap means 14 likewise may be continuously welded to each of the pan sidewalls, it has been found that such is not necessary and that a pair of short weld segments 20 adjacent the lateral edges of each pan formed by the same welding process as above described are entirely satisfactory.

The particular construction of the strap means 14 that is illustrated in the drawings is not considered essential to the invention but is preferred since it contributes to the structural integrity of the individual pans and the overall assembly. Specifically, and as shown most clearly in FIG. 2, the strap means 14 includes thickened upper and lower edge portions 14a and 14b, respectively, that are in the shape of solid rounded beads with flat surface portions on one side for mating with the similarly flat surface of the sidewalls of the pans 12. The upper and and lower thickened edge portions 14a and 14b are interconnected by an intermediate portion 14c that is concavely curved as viewed from the direction of the pan sidewalls. The opposite end portions of the strap 14 are overlapped as shown in FIG. 4 and are spot welded at the points 22 to complete the assembly.

While particular embodiments of the present invention have been shown and described, it is apparent that various changes and modifications may be made, and it is therefore intended in the following claims to cover all such modifications and changes as may fall within the true spirit and scope of this invention.

We claim:
1. A bread set or the like comprising:
a plurality of metal pans each including a bottom portion and a plurality of upwardly extending sidewalls each having a rolled bead protective rim portion, said pans being arranged in a predetermined spaced array;
elongated metal strap means, having an upper edge portion adjacent the underside of the rolled bead rim portions of predetermined ones of said pan sidewalls, for peripherally enclosing said spaced array of pans;
and connecting means defining a substantially continuous attachment between said upper edge portion of said strap means and the underside of said rolled bead rim portions of said predetermined ones of said pan sidewalls and comprising a metal integrally fused with said upper edge portion of said strap means and said rolled bead portions of said predetermined pan sidewalls for maintaining said pans in said predetermined spaced array and for securely fixing said rolled bead rim portions in position.

2. The bread set of claim 1 and further including second connecting means for attaching the lower edge portion of said strap means to said predetermined ones of said pan sidewalls at a plurality of spaced positions along each of said predetermined pan sidewalls.

3. The bread set of claim 2 in which the upper and lower edge portions of said strap means are substantially thicker than an intermediate strap portion and in which said intermediate portion is concavely curved as viewed from said pan sidewalls for reinforcing said plurality of metal pans and providing a secure bridge between said pans.

4. The bread set of claim 3 in which second connecting means comprises a metal integrally fused with said metal strap means and said metal pans and in which all of the metal is aluminum.

References Cited

UNITED STATES PATENTS

| 1,262,481 | 4/1918 | Haigh | 220—23.2 |
| 1,668,332 | 5/1928 | Ostendorf | 220—23.2 |
| 2,569,137 | 9/1951 | Westrich | 220—23.2 X |
| 3,200,489 | 8/1965 | Keeleric | 29—494 X |

GEORGE E. LOWRANCE, Primary Examiner

U.S. Cl. X.R.
29—494; 113—120